United States Patent Office 3,384,679
Patented May 21, 1968

3,384,679
COMPOSITION COMPRISING BLEND OF THERMO-
PLASTIC POLYURETHANE ELASTOMER AND
PHENOXY RESIN
Thomas T. Stetz, Jr., Olmsted Falls, Ohio, assignor to
The B. F. Goodrich Company, New York, N.Y., a corporation of New York
No Drawing. Filed Apr. 29, 1965, Ser. No. 452,016
9 Claims. (Cl. 260—830)

ABSTRACT OF THE DISCLOSURE

Polyurethane elastomer compositions having improved mechanical processing characteristics and physical properties are prepared by blending thermoplastic polyesterurethanes or polyetherurethanes with about 2 to about 100 parts by weight, per 100 parts by weight of polyurethane, of a thermoplastic copolymer of bisphenol A and epichlorohydrin.

---

This invention relates to polyurethane elastomer compositions which have improved mechanical processing characteristics, resistance to chemical attack and greater physical strength. More particularly, this invention concerns a mixture comprising a blend of a thermoplastic, substantially uncrosslinked polyesterurethane or polyetherurethane and a thermoplastic copolymer of bisphenol-A and epichlorohydrin.

U.S. Patent No. 2,871,218 describe thermoplastic polyesterurethane elastomers which are substantially free of crosslinked structures. These polyesterurethanes comprise the reaction product of a mixture of a hydroxyl terminated linear polyester, an aromatic diisocyanate, and an aliphatic glycol, said reaction product being essentially free of any unreacted isocyanate or hydroxyl groups. U.S. Patent No. 2,899,411 describes thermoplastic, substantially uncrosslinked polyetherurethane elastomers which comprise the reaction product of a hydroxyl poly (polymethylene oxide), an aliphatic glycol, and an aromatic diisocyanate. The aforesaid polyesterurethane and polyetherurethane materials are thermoplastic, extrudable, moldable, abrasion resistant, tough, rather hard elastomers. These elastomers are useful in the fabrication of seals, gaskets, bearings, shoe heels, solid tires, sheets for the production of gasoline tanks and other vessels, as coatings for fabrics, metal, paper, plastics, and as films used for packaging.

It is the object of this invention to improve the mechanical processing characteristics of the aforesaid polyurethane elastomers, that is, to provide more ease in the milling, molding and extrusion thereof. It is another object of this invention to improve the ductility, tensile strength, hardness and other physical properties of polyurethane elastomers. It is a further object of this invention to provide solutions of the polyurethane elastomers in various solvents having lower solution viscosities and to provide films and coatings of said polyurethanes having better adhesion to metals, higher tear strength and less permeability to water vapor. These and other objects are accomplished by blending with the polyurethane elastomer a thermoplastic copolymer of bisphenol A and epichlorohydrin as more fully set forth hereinbelow. Bisphenol A is the common name of 2,2-bis(4-hydroxyphenyl) propane.

The compositions of this invention comprise a homogeneous mixture of (I) 100 parts by weight of a thermoplastic polyurethane elastomer selected from the group consisting of
   (A) a polyesterurethane comprising the reaction product of the essential ingredients:
   (a) one mol of an essentially linear, hydroxyl terminated polyester of (i) a saturated, aliphatic glycol having from 2 to 10 carbon atoms and the hydroxyl groups on the terminal carbon atoms and (ii) a dicarboxylic acid of the formula HOOC—R—COOH where R is an alkylene radical having 2 to 8 carbon atoms, or the anhydride of said dibasic acid, said polyester having an average molecular weight from about 600 to about 2000 and an acid number of less than 10,
   (b) from about 1.3 to 3.0 mols of aromatic diisocyanate, and
   (c) from about 0.3 to 2.0 mols of saturated, aliphatic, free glycol (i.e., alkylene glycol) having from 2 to 6 carbon atoms and having the hydroxyl groups on the terminal carbon atoms, the molar amount of (a) and (c) combined being essentially equivalent to the molar amount of (b), such that there is essentially a stoichiometric equivalency of hydroxyl and isocyanate groups in the recipe and, ultimately, essentially no unreacted glycol or unreacted diisocyanate in the said reaction product; and (B) A polyetherurethane comprising the reaction product of the essential ingredients:
   (1) One mol of a hydroxyl poly (polymethylene oxide) of the formula

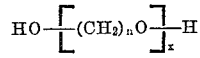

wherein $n$ is a number from 3 to 6 and $x$ is an integer greater than 7, and the molecular weight is from about 500 to about 4,000,
   (2) from about 1.5 to 3.0 mols of aromatic diisocyanate, and
   (3) from about 0.5 mol to 2.0 mols of an alkylene glycol having from 2 to 6 carbon atoms and the hydroxyl groups on the terminal carbon atoms, the molar amount of (1) and (3) combined being essentially equivalent to the molar amount of (2); and (II) from about 2 to about 100 parts by weight of a thermoplastic, linear, high molecular weight copolymer of bisphenol A and epichlorohydrin, said copolymer having the molecular structure

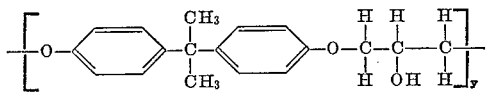

where $y$ is a number of such magnitude that the molecular weight of said copolymer is within the range of about 20,000 to about 40,000, and preferably about 30,000.

The aforesaid copolymers of epichlorohydrin/bisphenol A are well known materials commonly referred to as phenoxy resins. The plastics are commercially available under the trademark "Bakelite" phenoxy resins (Union Carbide Corporation). One method for their preparation is described in U.S. Patent No. 2,602,075. The thermoplastic phenoxy resins have melt-flow temperatures within the range of about 125° C. to about 150° C. The melt-flow temperature of a plastic is the minimum temperature at which the material can be "worked," i.e., milled, calendered, extruded, molded, etc.

The basic polyester reactant embodied in the polyesterurethane elastomer is essentially linear and is hydroxyl terminated. It is the condensation product obtained by an esterification of an aliphatic dicarboxylic acid or an anhydride thereof with a straight chain glycol containing 2 to 10 carbon atoms and having its hydroxyl groups on the terminal carbon atoms, for example, ethylene glycol, 1,3-propanediol, 1,4-butanediol, 1,5-pentanediol, 1,6-hexanediol, and the like and mixtures thereof. Examples of the aliphatic, dibasic, carboxylic acids utilized in preparing the polyester are adipic, succinic, pimelic, suberic, azelaic, sebacic and the like, or their anhydrides. In the preparation of the polyesters, molar ratios of more than one mol of glycol per mol of acid are preferred so as to obtain essentially linear chains containing a preponderance of terminal hydroxyl groups. The methods and details of producing such polyesters are well known. The polyester suitable as a component of the polyesterurethane elastomer embodied in this invention is characterized by having an average molecular weight of from about 600 to 2000, a hydroxyl number of from about 50 to 180 and an acid number of less than 10, preferably less than 7. The quality of the polyesterurethane product increases as the acid number of the polyester decreases. An acid number of less than about 4.0 is thus more preferred, and an acid number of less than 2.0 is most desirable.

As previously stated, the basic polyether reactant embodied in the polyetherurethane elastomer has the formula $$HO-[(CH_2)_nO]_x-H$$

wherein $n$ is a number of from 3 to 6 and $x$ is an integer greater than 7 such that the molecular weight is from about 500 to about 4,000. Preferred is hydroxyl poly(tetramethylene oxide) having a molecular weight of from about 900 to 3,000. The preferred polyetherurethanes are comprised of one mol of the hydroxyl poly(tetramethylene oxide), from 1.0 to 2.0 mols of an alkylene glycol having 2 to 6 carbon atoms, and 2.0 to 3.0 mols of a diphenyl diisocyanate, the molar amount of the hydroxyl poly(tetramethylene oxide) and alkylene glycol combined being essentially equivalent to the molar amount of diphenyl diisocyanate.

The free alkylene glycol reactant embodied in the polyurethane elastomer, i.e., the chain extender in the polymer structure, is a linear, saturated diol having 2 to 6 carbon atoms and the hydroxyl groups on the terminal carbon atoms, ethylene glycol and 1,4-butanediol being preferred.

The aromatic diisocyanate constituent of the polyurethane is exemplified by such compounds as aromatic diisocyanates containing at least one phenyl group, and preferably diphenyl diisocyanates having an isocyanate group on each phenyl nucleus. Representative diisocyanates include para-phenylene diisocyanate, meta-phenylene diisocyanate, naphthalene-1,5-diisocyanate, tetrachloro m-phenylene diisocyanate, durene diisocyanate, 2,4-toluene diisocyanate and 2,6-toluene diisocyanate and mixtures thereof, and the like, 4,4'-diphenyl diisocyanate, the dichloro-diphenyl methane diisocyanates, bibenzyl diisocyanate, bitolylene diisocyanate, the diphenyl ether diiocyanates, the dimethyl diphenyl methane diisocyanates, and preferably the diphenyl methane diisocyanates represented by

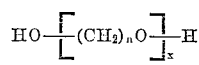

especially diphenyl methane-p,p'-diisocyanate having the formula

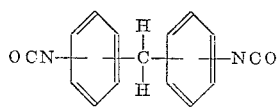

A convenient method for preparing the elastomers embodied herein is to react a mixture of the polyester (or polyether) and glycol with the aromatic diisocyanate at a temperature within the range of about 120° C. to about 250° C. for a period of time sufficient to insure essentially complete stoichiometric utilization of the reactants according to their molar equivalencies as charged. The polymerizations should be carried out under essentially anhydrous conditions with dry reactants, that is, the reaction mixture is substantially free of water which would react with isocyanate groups to form undesirable by-products. As a practical matter, there should be less than about 0.1% and preferably less than 0.05% of water present in the reaction mixtures. Essentially anhydrous conditions can be assured by simply heating the polyester or polyether and glycol at low pressure before mixing with the anhydrous diisocyanate. The resulting polyurethane elastomers are thermoplastics having melt-flow temperatures within the range of about 90° C. to about 180° C.

The compositions of this invention are conveniently prepared by blending the polyurethane and the phenoxy resin at a temperature of from about 140° C. to 185° C., depending upon the characteristics of the particular elastomer being modified, using conventional plastics or rubber compounding equipment, such as Banbury mixers and roll-mills. The two polymers are unexpectedly very compatible and form a remarkably homogeneous blend, this despite their widely differing chemical molecular structures. The improvement in processing characteristics of the blends compared to both the polyurethane and the phenoxy resin alone is apparent when the materials are milled and extruded. For instance, the tendency of the hot plastics to stick to the mill is reduced by the mixing thereof, and better surface appearance and higher extrusion rates are obtained.

The compositions of this invention may also have incorporated therein small amounts, e.g., from about 0.1 to 20 parts per hundred parts by weight of the polyurethane, of well known elastomers modifiers to serve as mechanical processing aids, for example, inert fillers such as silica, and lubricants such as calcium stearate.

The compositions of this invention are soluble in various solvents such as dimethyl formamide, dioxane, cyclohexanone, tetrahydrofurane, and methyl ethyl ketone. The most useful solutions contain from about 10 to about 30 weight percent of the polymer mixture. More rapid solubilization of the compositions is obtained by moderate heating, i.e., to around 30° C. to 50° C. Coatings of the polymer blend may be applied from the aforesaid solutions on the surfaces of metals and fabrics by the well known operations of spraying, dipping, knife or roller coating. Films are produced by the usual method of casting from solution. As mentioned previously, the solutions of the blends are less viscous than solutions of the polyurethane alone. This makes the aforesaid coating and film-making operations more economical because of the need for less solvent recovery and, of course, a resulting decrease in solvent losses. Moreover, the films and coatings of the mixture of polymers have superior physical properties than the unmodified polyurethane.

The following examples are presented to illustrate and clarify the invention and should not be regarded as limiting the scope thereof as defined by the appended claims. In the preparation of the compositions described in the examples, the ingredients were mixed in a Banbury mixer and a two-roll mill at a stock temperature of about 140° C. to 185° C., and then representative samples were either compression molded at 175° C. into 6" x 6" x 0.075" sheets or cast into thin films from a 25 percent solution in methyl ethyl ketone to obtain specimens for physical testing in accordance with the following procedures and others hereinafter described:

Ultimate tensile strength p.s.i., ultimate elongation in percent (i.e., at break), and modulus in p.s.i. (i.e. tensile stress): ASTM Test Method D412–51T.

Hardness in Duro D units was determined using a durometer as per ASTM Test Method D676–59T.

Graves tear strength in lbs./inch: ASTM D1004–597.

Water vapor transmission rate (MVT): ASTM E96–53T.

Example 1

In this example the urethane elastomer was a polyesterurethane produced by the reaction of one mol of an essentially linear, hydroxyl terminated polyester of 1,4-butanediol and adipic acid having a molecular weight of about 1000 and an acid number of 2.0, two mols of 1,4-butanediol and three mols of diphenyl methane-p,p'-diisocyanate (known in the trade as MDI). The phenoxy resins blended therewith had molecular weights on the order of about 30,000. The data are set forth in the following Table 1. The amounts of material are in parts by weight:

TABLE 1

| Experiment No | 1* | 2 | 3 | 4 | 5 | 6 | 7 | 8 | 9 | 10 | 11 |
|---|---|---|---|---|---|---|---|---|---|---|---|
| Polyesterurethane, parts | 100 | 100 | 100 | 100 | 100 | 100 | 100 | 100 | 100 | 100 | 100 |
| Phenoxy Resin, parts: | | | | | | | | | | | |
| Bakelite Phenoxy PKHH | | 11 | 33.3 | 66.5 | 100 | | | | | | |
| Bakelite Phenoxy PRDA 8030 | | | | | | 2 | 4 | 10 | 66.5 | | |
| Bakelite Phenoxy PRDA 8060 | | | | | | | | | | 10 | 66.5 |
| Physical Properties: | | | | | | | | | | | |
| Tensile Strength | 5,800 | 7,950 | 8,540 | 8,300 | 7,360 | 7,000 | 6,350 | 5,700 | 6,594 | 6,450 | 6,179 |
| 300% Modulus | 1,400 | 4,980 | 7,780 | N.M. | N.M. | 2,750 | 2,850 | 3,910 | N.M. | 3,910 | N.M. |
| Elongation, Percent | 500 | 400 | 310 | 300 | 230 | 530 | 550 | 400 | 260 | 420 | 250 |
| Hardness, Shore D | 35 | 45 | 63 | 75 | 80 | 47 | 47 | 50 | N.M. | 50 | N.M. |
| Graves Tear Strength | 400 | 660 | 730 | N.M. | N.M. | N.M. | N.M. | N.M. | N.M. | N.M. | N.M. |

*Control.
NOTE.—N.M. means not measured.

Example 2

Blends were made comprising (1) a polyesterurethane produced by the reaction of one mole of an essentially linear, hydroxyl terminated polyester of adipic acid and 1,4-butanediol having a molecular weight of about 1000 and an acid number of 2.0, three tenths of a mol of 1,4-butanediol and one and three tenths mols of diphenyl methane-p,p'-diisocyanate and (2) Bakelite Phenoxy PKHH resin having a molecular weight of about 30,000. Films of the blends were prepared from 25% solutions in methyl ethyl ketone (MEK) by casting the solution onto a Teflon covered metal plate, evaporating the solvent, and then stripping the film from the plate. The data relating to the physical properties of the solutions and films are set forth in Table 2. The results show that for a given total solids solution concentration, a higher percentage of phenoxy resin gives a lower solution viscosity. Also a lower MVT rate is obtained by increasing the amount of phenoxy resin.

TABLE 2

| Experiment No | 12* | 13 | 14 |
|---|---|---|---|
| Polyesterurethane, parts | 100 | 100 | 100 |
| Phenoxy resin, parts: | | | |
| Brookfield Viscosity of 25% solution of polymer mixture in MEK, centipoises | 5,200 | 2,320 | 1,105 |
| Physical Properties of Films: | | | |
| Dry Film Thickness, mils | 5.7 | 4.9 | 4.5 |
| Tensile Strength | 5,350 | 4,330 | 7,330 |
| 300% Modulus | 430 | 320 | 6,430 |
| Elongation, Percent | 730 | 750 | 400 |
| Graves Tear | 187 | 131 | 575 |
| MTV rate in grams of water vapor per 100 sq. inches in 24 hours | 19.8 | 11.3 | 3.2 |

*Control.

Example 3

The polyesterurethane elastomer described in Example 2 was blended with Bakelite Phenoxy PKHH resin. Film samples 4 to 6 mils thick were cast therefrom and these samples and a control specimen were checked for resistance to chemical attack with the results tabulated in Table 3. The data show the significant superiority of the compositions of the invention.

TABLE 3

| | Experiment No. | | | | | |
|---|---|---|---|---|---|---|
| | 15 (Control) | | | 16 | | |
| Polyesterurethane, parts | 100 | | | 100 | | |
| Phenoxy Resin, parts | | | | 100 | | |
| | Before Immersion | After Immersion* in 20% NaOH sol. | After Immersion* in 20% H₂SO₄ | Before Immersion | After Immersion* in 20% NaOH sol. | After Immersion* in 20% H₂SO₄ |
| Physical Properties: | | | | | | |
| Tensile Strength | 5,350 | Partially Dissolved | 300 | 7,330 | 5,900 | 6,780 |
| 300% Modulus | 430 | | N.M. | 6,430 | 5,600 | 6,030 |
| Elongation, percent | 730 | | 200 | 400 | 310 | 310 |
| Weight Change, percent | | | −0.19 | | +0.33 | +0.82 |
| Volume change, percent | | | −0.10 | | +1.20 | +0.49 |

*Immersed 28 days at 73° F.
NOTE.—N.M. means not measured.

Example 4

This example illustrates the modification of a polyetherurethane comprising the reaction product of one mol of hydroxyl poly(polymethylene oxide) having a molecular weight of about 1000, one mol of 1,4-butanediol and 2 mols of MDI. The phenoxy resin used was Bakelite Phenoxy PKHH. The mixtures, which were fluxed on a mill at 280 to 365° F., showed excellent processing characteristics. In contrast, however, the control sample stuck to the mill quite badly. The physical properties of the compositions are set forth in Table 4.

TABLE 4

| Experiment No | 17* | 18 | 19 | 20 | 21 | 22 |
|---|---|---|---|---|---|---|
| Polyetherurethane, parts | 100 | 100 | 100 | 100 | 100 | 100 |
| Phenoxy resin, parts | | 2 | 10 | 25 | 50 | 100 |
| Physical Properties: | | | | | | |
| Tensile Strength | 5,940 | 5,300 | 5,300 | 4,550 | 4,580 | 7,350 |
| 300% Modulus | 1,100 | 1,130 | 1,170 | 1,210 | 3,240 | 6,350 |
| Elongation, percent | 580 | 570 | 550 | 490 | 380 | 320 |
| Hardness | 33 | 33 | 34 | 35 | 45 | 73 |

*Control.

I claim:
1. A composition comprising the mixture of (I) 100 parts by weight of a thermoplastic polyurethane elastomer essentially free of unreacted isocyanate or hydroxyl groups selected from the group consisting of
   (A) a polyesterurethane comprising the reaction product of the essential ingredients:
      (a) one mol of an essentially linear, hydroxyl terminated polyester of (i) a saturated, aliphatic glycol having from 2 to 10 carbon atoms and the hydroxyl groups on the terminal carbon atoms, and (ii) a compound selected from the group consisting of dicarboxylic acids of the formula HOOC—R—COOH where R is an alkylene radical having 2 to 8 carbon atoms, and the anhydrides of said acids, said polyester having an average molecular weight of from about 600 to about 2000 and an acid number of less than 10,
      (b) from about 1.3 to 3.0 mols of an aromatic diisocyanate, and
      (c) from about 0.3 to 2.0 mols of a saturated, aliphatic glycol having from 2 to 6 carbon atoms and the hydroxyl groups on the terminal carbon atoms, the molar amount of (a) and (c) combined being essentially equivalent to the molar amounts of (b), and
   (B) a polyetherurethane comprising the reaction product of the essential ingredients:
      (1) one mol of a hydroxyl poly(polymethylene oxide) of the formula

$$HO{-}(CH_2)_nO{-}_xH$$

wherein $n$ is a number from 3 to 6 and $x$ is an integer greater than 7, and the molecular weight is from about 500 to about 4,000,
      (2) from about 1.5 to 3.0 mols of an aromatic diisocyanate, and
      (3) from about 0.5 to 2.0 mols of a saturated, aliphatic glycol having from 2 to 6 carbon atoms and the hydroxyl groups on the terminal carbon atoms, the molar amount of (1) and (3) combined being essentially equivalent to the molar amount of (2), and
(II) from about 2 to about 100 parts by weight of a thermoplastic, linear copolymer of Bisphenol A and epichlorohydrin, said copolymer having the molecular structure

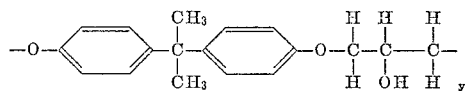

where $y$ is a number of such magnitude that the molecular weight of said copolymer is within the range of about 20,000 to about 40,000.

2. The composition according to claim 1 wherein the aromatic diisocyanate is a diphenyl diisocyanate having an isocyanate group on each phenyl nucleus.

3. The composition according to claim 1 wherein the aromatic diisocyanate is diphenyl methane-p,p'-diisocyanate.

4. A composition comprising the mixture of
(I) 100 parts by weight of a thermoplastic polyesterurethane elastomer essentially free of unreacted isocyanate or hydroxyl groups comprising the reaction product of the essential ingredients:
   (a) one mole of an essentially linear, hydroxyl terminated polyester of (i) a saturated, aliphatic glycol having from 2 to 10 carbon atoms and the hydroxyl groups on the terminal carbon atoms, and (ii) a compound selected from the group consisting of dicarboxylic acids of the formula HOOC—R—COOH where R is an alkylene radical having 2 to 8 carbon atoms, and the anhydrides of said acids, said polyester having an average molecular weight of from about 600 to about 2000 and an acid number of less than 10,
   (b) from about 1.3 to 3.0 mols of an aromatic diisocyanate, and
   (c) from about 0.3 to 2.0 mols of a saturated, aliphatic glycol having from 2 to 6 carbon atoms and the hydroxyl groups on the terminal carbon atoms, the molar amount of (a) and (c) combined being essentially equivalent to the molar amount of (b), and
(II) from about 2 to about 100 parts by weight of a thermoplastic, linear copolymer of Bisphenol A and epichlorohydrin, said copolymer having the molecular structure

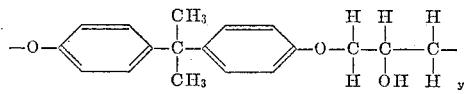

where $y$ is a number of such magnitude that the molecular weight of said copolymer is about 30,000.

5. The composition according to claim 4 wherein the aromatic diisocyanate is a diphenyl diisocyanate having an isocyanate group on each phenyl nucleus.

6. The composition according to claim 4 wherein the aromatic diisocyanate is diphenyl methane-p,p'-diisocyanate.

7. A composition comprising the mixture of
(I) 100 parts by weight of a thermoplastic polyetherurethane elastomer essentially free of unreacted isocyanate or hydroxyl groups comprising the reaction product of the essential ingredients:
   (a) one mol of hydroxyl poly(tetramethylene oxide) having a molecular weight of from about 900 to 3,000,
   (b) from about 2.0 to 3.0 mols of a diphenyl diisocyanate having an isocyanate group on each phenyl nucleus, and
   (c) from about 1.0 to 2.0 mols of a saturated, aliphatic glycol having from 2 to 6 carbon atoms and the hydroxyl groups on the terminal carbon atoms, the molar amount of (a) and (c) combined being essentially equivalent to the molar amount of (b), and
(II) from about 2 to about 100 parts by weight of a thermoplastic, linear copolymer of Bisphenol A and epichlorohydrin, said copolymer having the molecular structure

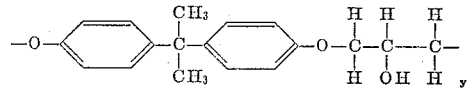

where $y$ is a number of such magnitude that the molecular weight of said copolymer is within the range of about 20,000 to about 40,000.

8. The composition according to claim 7 wherein the aromatic diisocyanate is diphenyl methane-p,p'-diisocyanate.

9. The composition according to claim 8 where the copolymer of (II) has a molecular weight of about 30,000.

References Cited

UNITED STATES PATENTS

| | | | |
|---|---|---|---|
| 2,871,218 | 1/1959 | Schollenberger | 260—858 |
| 2,899,411 | 8/1959 | Schollenberger | 260—77.5 |
| 3,177,090 | 4/1965 | Bayes | 260—837 |

MURRAY TILLMAN, *Primary Examiner.*

GEORGE F. LESMES, *Examiner.*

P. LIEBERMAN, *Assistant Examiner.*

UNITED STATES PATENT OFFICE
CERTIFICATE OF CORRECTION

Patent No. 3,384,679                                May 21, 1968

Thomas T. Stetz, Jr.

It is certified that error appears in the above identified patent and that said Letters Patent are hereby corrected as shown below:

Column 6, TABLE 2, third column, line 2 thereof, insert -- 25 --; same TABLE 2, fourth column, line 2 thereof, insert -- 100 --; same TABLE 2, first column, line 11 thereof, "MTV" should read -- MVT --. Columns 9 and 10, in the list of References Cited, add the following:

3,320,090    5/1967    Graubart -------- 260-858

Signed and sealed this 16th day of December 1969.

SEAL)
Attest:

Edward M. Fletcher, Jr.                      WILLIAM E. SCHUYLER, JR.
Attesting Officer                                        Commissioner of Patents